US012634125B2

(12) United States Patent
French

(10) Patent No.: US 12,634,125 B2
(45) Date of Patent: May 19, 2026

(54) METHODS FOR ENCRYPTING DATA, DECRYPTING DATA, AND SEARCHING ENCRYPTED DATA

(71) Applicant: Barclays Execution Services Limited, London (GB)

(72) Inventor: George French, London (GB)

(73) Assignee: Barclays Execution Services Limited, London (GB)

( * ) Notice: Subject to any disclaimer, the term of this patent is extended or adjusted under 35 U.S.C. 154(b) by 116 days.

(21) Appl. No.: 18/601,086

(22) Filed: Mar. 11, 2024

(65) Prior Publication Data

US 2024/0313959 A1 Sep. 19, 2024

(30) Foreign Application Priority Data

Mar. 14, 2023 (EP) ..................................... 23161850

(51) Int. Cl.
*H04L 9/08* (2006.01)
*H04L 9/06* (2006.01)
*H04L 9/14* (2006.01)

(52) U.S. Cl.
CPC .......... *H04L 9/0869* (2013.01); *H04L 9/0618* (2013.01); *H04L 9/065* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 11,228,566 B1 * | 1/2022 | Kothari | G06F 16/258 |
| 2009/0323932 A1 * | 12/2009 | Youn | H04L 9/002 |
| | | | 380/28 |
| 2010/0169293 A1 * | 7/2010 | Gerber | G06F 16/951 |
| | | | 707/706 |
| 2015/0341169 A1 * | 11/2015 | Leppanen | H04W 12/037 |
| | | | 380/44 |

(Continued)

FOREIGN PATENT DOCUMENTS

| | | |
|---|---|---|
| DE | 102008042406 A1 | 4/2010 |
| EP | 3996321 A1 | 5/2022 |

OTHER PUBLICATIONS

Bosch et al., "A Survey of Provably Secure Searchable Encryption," ACM Computing Surveys, Aug. 25, 2014, vol. 47, No. 2, article 18, pp. 1-51.

(Continued)

*Primary Examiner* — Michael Pyzocha
(74) *Attorney, Agent, or Firm* — Wilmer Cutler Pickering Hale and Dorr LLP

(57) ABSTRACT
The invention provides computer-implemented methods for encrypting data, searching ciphertext, and decrypting ciphertext, and data processing apparatuses, computer programs, and computer readable storage media for achieving the same. Encrypting data comprises salting and then encrypting ciphertext, both processes using a respective exclusive OR operation. Decryption is achieved by the same process in reverse. Searching the ciphertext is achieved by generating a modifier and salted search term, before modifying the ciphertext with the modifier and performing a bytewise comparison between the salted search term and the modified ciphertext.

19 Claims, 9 Drawing Sheets

(56) References Cited

U.S. PATENT DOCUMENTS

| | | | |
|---|---|---|---|
| 2018/0337778 A1* | 11/2018 | Scheiblauer | H04L 9/0866 |
| 2019/0130125 A1* | 5/2019 | Yoshino | H04L 9/06 |
| 2022/0311597 A1* | 9/2022 | Goel | H04L 9/14 |
| 2022/0382900 A1* | 12/2022 | Aoudia | H04L 9/008 |
| 2023/0134515 A1* | 5/2023 | Mukai | H04L 9/0894 |
| 2024/0154788 A1* | 5/2024 | Bhunia | G06N 3/08 |
| 2025/0004722 A1* | 1/2025 | Olie | G06F 7/582 |
| 2025/0028853 A1* | 1/2025 | Dupont | H04L 9/3213 |

OTHER PUBLICATIONS

The extended European Search Report mailed Aug. 18, 2023, in European patent application No. 23161850.5. 8 pages.

* cited by examiner

METHODS FOR ENCRYPTING DATA, DECRYPTING DATA, AND SEARCHING ENCRYPTED DATA

CROSS-REFERENCE TO RELATED APPLICATION

This application claims priority to European Patent Application No. 23161850.5, filed on Mar. 14, 2023, in the European Patent Office, the entire contents of which are incorporated by reference herein in their entirety.

TECHNICAL FIELD

This disclosure relates to computer-implemented methods for encrypting data, searching ciphertext, and decrypting ciphertext, and data processing apparatuses, computer programs, and computer readable storage media for achieving the same.

BACKGROUND

In the field of cryptography, data can be encrypted using a key such that the data are not readable or intelligible by a third party who does not possess a key. The data in its original state, i.e. before encryption with a key, is typically referred to as plaintext and the data in its encrypted state, i.e. after encryption with a key, is typically referred to as ciphertext.

Storing data as ciphertext, rather than as plaintext, is advantageous for data security because an attacker, in the event of a security breach, can retrieve only the ciphertext which is unintelligible to them and any other party who does not possess the key.

Once ciphertext has been encrypted, it can only be decrypted by a party which has access to the same key with which it was encrypted in the case of symmetric encryption, or by a party which has a private key (corresponding to the original encryption key) in the case of asymmetric encryption.

Broadly, methods of encryption fall into two categories: deterministic and non-deterministic.

If an encryption algorithm is deterministic, a given input message and encryption key will always produce the same encrypted output message. In other words, a given plaintext will always produce the same ciphertext when encrypted. For example, a simple deterministic encryption algorithm might be to replace each letter of an input message with the letter one space to the right of it on a UK keyboard. In this example, the input message "Sequoia" will always be encrypted as "Drwipos".

In an encryption algorithm is non-deterministic, also referred to as probabilistic, it involves some randomness, such that a given input message will produce a different encrypted output message each time it is encrypted. In other words, a given plaintext will not always produce the same ciphertext when encrypted. For example, a simple non-deterministic encryption algorithm might be to replace each letter of an input message with the letter of the alphabet corresponding to a randomly generated number between 1 and 26. In this example, numbers 11, 3, 9, 4, 13, 10, and 18 might be randomly selected, leading input message "Sequoia" to be encrypted as "Kcidmjr". A subsequent encryption of "Sequoia", with different randomly generated numbers, would return a different ciphertext.

Deterministic encryption can be advantageous because it facilitates searching and indexing of encrypted data. If, having encrypted and stored the names of a number of Californian tree genera, it is desired to know whether "Sequoia" is present in that stored file, the ciphertext "Drwipos" can be searched for. This is because, in every circumstance, "Sequoia" will generate "Drwipos" when encrypted.

Deterministic encryption is disadvantageous because third parties who gain access to the ciphertexts can derive information from them, despite the underlying plaintext having been encrypted. Multiple instances of the same encrypted plaintext are instantly recognisable, because they are identical even as ciphertext, and pattern recognition can be used to glean insights into the stored ciphertexts. Real-world context can also be mapped to the production of specific ciphertexts. For example, if a given ciphertext is always observed directly before a battleship docks at a certain port, a nefarious third party with access to the ciphertexts can derive very quickly the effect that observing that given ciphertext is likely to have. Not only can the third party then predict the movement of the battleship, rendering the encryption effectively useless, but this learned correlation may expedite the process of breaking the encryption altogether.

The same is true when deterministically encrypted data is searched. Patterns may be recognised in the content and/or context of a specific ciphertext being searched for, which may give away information as to the plaintext being searched for and the encryption algorithm itself. Leakage of any kind is exacerbated when public key encryption is used, because the third party has access to the encryption key. The third party can guess at the underlying plaintext, encrypt the guess with the public key, and compare the result to the ciphertext in order to determine whether the guess was correct.

Furthermore, deterministically encrypted data cannot readily be searched with a partial field search. In other words, it is normally only possible to search for the entirety of the plaintext as it was encrypted, and not for a portion thereof. This limits the utility of deterministically encrypted databases.

Non-deterministic encryption, on the other hand, does not suffer from such issues of leakage. The randomness inherent in the generation of the ciphertext is such that simply pattern recognition is not possible. Two identical plaintexts will appear as different ciphertexts when encrypted and stored. Two identical battleship movement commands will be preceded by different ciphertexts.

However, these advantages necessarily lead to difficulty in searching non-deterministically encrypted data. Attempting to search for "Sequoia" by encrypting "Sequoia" and searching for the result will be ineffective, because there is not a one-to-one correlation between plaintext and ciphertext. In the example above, "Sequoia" was non-deterministically encrypted as "Kcidmjr", but when the same plaintext is encrypted again for the purposes of search, the encryption could return "Ebabgpd". The encrypted search term does not match the ciphertext, despite identical input plaintexts.

There remains a need for an improved method of encryption, decryption, and search which is secure but allows for search which is efficient and limits data leakage.

SUMMARY

In a first aspect of the invention, there is provided a computer-implemented method for encrypting data, comprising: i) receiving plaintext and a first key; ii) generating a first random salt; iii) performing an exclusive OR operation on the plaintext and the first random salt to produce salted plaintext; and iv) performing an exclusive OR opera-tion on the salted plaintext and the first key to produce ciphertext.

In this way, the invention provides a non-deterministic encryption of the plaintext which facilitates later secure searching. The properties of the exclusive OR function performing on the plaintext and the random salt, and then on the salted plaintext and the first key, lead to the ciphertext 'containing' both the salt and the key. In other words, the ciphertext can be 'un-salted' and decrypted with respective exclusive OR functions performed on the ciphertext. These properties of the ciphertext are advantageous for facilitating secure search, as will be described in greater detail below.

Plaintext may also be referred to as a "message", or "input message", and refers to the data bits that it is desirable to encrypt. There are myriad examples of categories of data that it is desirous and advantageous to encrypt in a manner that facilitates secure searching. Indeed, any plaintext that must be kept secure, but who's contents must be susceptible to interrogation. One such example is personal and financial data. Databases storing this data may need to be interrogated in order to provision and activate payment accounts or process transactions, for example, but must also not be presented in the clear to any eavesdropping third party.

The first key may be received from a key generation module which may generate the key in any suitable manner apparent to the skilled person. Key generation may be as simple as random number generation, or could be more complex in order to improve the security of the encrypted data. For example, key generation may be constrained such that no one key can be used twice within a given time period, or indeed ever again.

Performing an exclusive OR operation on two data items, such as between the plaintext and the random salt and between the salted plaintext and the first key, may be performed in a bytewise fashion, or with multiple bytes in parallel.

The encryption can be considered to be non-deterministic, or probabilistic, due to the use of the random salt. Since any given plaintext is salted prior to its encryption with the key, the salted plaintext will be random. Salting, in the context of this invention, is used to refer to the process of performing an exclusive OR operation on a random salt of bit length x and a plaintext of bit length x (or on equivalently sized blocks of salt and plaintext).

The generation of the random salt can be achieved by any suitable method that may be apparent to the skilled person. For example, any form of pseudorandom or true random number generator could be used, although true random number generation is preferable for data security.

The method may further comprise: partitioning the plain-text into n plaintext blocks; producing n salt blocks from the first random salt; producing a key stream from the first key; and producing n ciphertext blocks, wherein producing n ciphertext blocks comprises performing steps iii) and iv) of claim 1 for each of the n plaintext blocks, n salt blocks, and the key stream.

In this way, the method of encryption can be used for plaintexts and keys of any length, because the key stream can be generated to have a desired bit length, i.e. to match the length of the plaintext and random salt. The random salt may be generated to be the same bit length as the plaintext. In order to facilitate an exclusive OR being performed between each block of the salted plaintext and the key stream, the key stream may be partitioned into blocks of equal byte length to the byte length of the blocks of salted plaintext.

Producing a key stream from the first key may comprise using a block cipher, optionally wherein the block cipher comprises an advanced encryption standard algorithm using the first key, a nonce, and first input data as inputs, wherein the first input data is not the plaintext, further optionally wherein the first input data comprises data associated with the plaintext, for example a field name associated with the plaintext.

In this way, the encryption benefits from the advantages associated with block ciphers which use a stream-based encryption key, including excellent tamper resistance and high diffusion.

A nonce, in the context of the invention, refers to any number used only once, i.e. once used for an encryption is not used for a subsequent encryption. Nonce reuse may be avoided in many ways, for example using a counter to increment from the previous nonce, or using a Synthetic Initial Vector mode of operation (SIV).

The first input data replaces what would usually be the plaintext being encrypted with the block cipher. A typical block cipher such as AES would use as its inputs a key, a nonce or IV, and the plaintext to be encrypted, with the output being the ciphertext. However, with such a typical cipher, the plaintext is required in order to recreate the keystream.

The present invention uses input data which is not the plaintext in order to allow regeneration of the keystream without the need for the presence of the plaintext. The plaintext and the key need never, therefore, be stored or exist at the same time in the same location. This is true even when decryption of the ciphertext is performed, because the result of the initial decryption with the key stream is salted plaintext, and not the plaintext itself.

When searching the ciphertext is performed, the input data that would have been used to generate the key stream for the plaintext being searched for can be derived. In other words, the input data may be associated with the plaintext to a sufficient extent that it can be derived for any search term.

For example, at the point of encryption, input data may be generated deterministically using the plaintext. Then, when it is desired to search the encrypted data for the plaintext, the plaintext can again be used to derive the input data, and the input data sent to the key generation module.

Alternatively, in another example, the input data may comprise a characteristic of the plaintext, such as the field name associated with the plaintext. For example, if encrypt-ing a user's address: "One Churchill Place", the input data may be an identifier that the encrypted data is an address: "UserAddress". Other examples of input data that could be associated with certain plaintext contents may therefore be: "UserID"; "UserName"; "AccountNumber"; "ProductID"; or any other suitable data that can be reliably and repeatably associated with the plaintext at the point of encryption, decryption, and search.

The block cipher may comprise a synthetic initialisation vector, optionally wherein the block cipher is configured to operate as a stream cipher, optionally wherein the block cipher is one of: Galois Counter Mode (AES-GCM-SIV), Counter Mode (AES-CTR-SIV), Cipher Feedback Mode (AES-CFB-SIV), and Output Feedback Mode (AES-OFB-SIV).

Implementing the encryption using AES has been found to be particularly beneficial, due to the robustness against hacking and reliability of AES. AES is a deterministic encryption algorithm, so usually suffers from the drawbacks associated with such algorithms. However, because in the present invention the input plaintext has first been salted, the overall method of encryption becomes non-deterministic, despite using a deterministically derived stream cipher.

In such methods, the input data may be provided as the input to the cipher-based message authentication code (CMAC) calculation, and anywhere else that would otherwise require the plaintext as input.

Throughout this document, an X is added to the end of acronyms referring to encryption algorithms to denote the difference between encryption algorithms as implemented by the present invention and those known in the art, brought about by the use of input data which is not the plaintext in place of the plaintext. For example, where the skilled person would understand the implementation of AES-GCM-SIV, AES-GCM-SIVX might be used to denote a suitable implementation of AES-GCM-SIV, but using input data as described herein and not the plaintext itself.

Similarly, but used more generally to capture any AES implementation, AESSIVX is used to refer to any suitable AES encryption algorithm, using synthetic IV, and modified to use input data as described herein in place of the plaintext itself.

Producing n salt blocks from the first random salt may comprise passing the first random salt through an extender, and wherein the n salt blocks are produced so as to have a combined byte length equal to the byte length of the plaintext. An extender, configured to partition the first random salt into discrete blocks of the same byte length as the blocks of plaintext and blocks of key stream is an efficient way to facilitate the exclusive OR operation between the blocks of salt and the blocks of plaintext which requires equal byte length inputs. The extender may be, for example, a repeated hashing function, such as SHA-256, but other operations suitable for the function of the extender as described herein could also be used.

The method may further comprise: storing the ciphertext and the first random salt in a first database; and storing the first key in a second database, the first and second database being remote from one another.

In this way, a successful attack on either database does not compromise the security of the plaintext. A leak from the first database, providing a third party with both the ciphertext and the salt, does not allow the plaintext to be generated, because the encryption key is not known. Similarly, a third party intercepting the ciphertext and breaking into the second database cannot derive the plaintext, because the salt is not known.

In a second aspect of the invention, there is provided a computer-implemented method for searching ciphertext encrypted by a method according to any one of the preceding aspects, the method comprising: i) receiving the ciphertext, the first key, the first random salt, and a search term; ii) generating a salted search term and a modifier, comprising: a) generating a second random salt; b) performing an exclusive OR operation on the second random salt and the first key to produce the modifier; c) performing an exclusive OR operation on the second random salt and the search term; and d) performing an exclusive OR operation on the product of step c) and the first random salt to produce a salted search term; iii) performing an exclusive OR operation on the ciphertext and the modifier to produce modified ciphertext; and iv) performing a bytewise comparison between the modified ciphertext and the salted search term to determine a level of similarity between the salted search and the modified ciphertext.

In this way, the invention provides an efficient and secure method for searching non-deterministically encrypted data. The search term itself is advantageously obscured by the use of a second random salt, thereby protecting its security. The modifier is also produced by using the second random salt as an input, and is thus similarly obscured. In other words, neither the salted search term, nor the modifier and modified ciphertext, provide information to a third party which could allow it to derive the plaintext.

Both the modified ciphertext and salted search term have been obscured by the first random salt and the second random salt during their generation. Similarly, both the modified ciphertext and the salted search term are, effectively, encrypted under the first key, because both have been combined with the key with an exclusive OR operation.

Due to the properties of the exclusive OR operation used to introduce the first and second random salts, and the key, to the modifier and salted search term, the bytewise comparison is still effective in determining whether the search term matches the plaintext. In other words, because the modified ciphertext and salted search term are both salted in the same way by both the first random salt and the second random salt, and encrypted in the same way and by the same key, the salting and encryption on each is the same. As such, the bytewise comparison between the two is a meaningful search of the underlying plaintext by the search term, all while ensuring that the search term and plaintext never appear in the clear.

The method may further comprise: providing a positive output if the salted search and at least a portion of the modified ciphertext are identical, the positive output indicating that the search term exists in the plaintext; and providing a negative output if the salted search is not identical with any portion of the modified ciphertext, the negative output indicating that the search term does not exist in the plaintext.

The positive and negative outputs may be, for example, computer-readable messages for transmission to a processor for further evaluation and/or processing. For example, if the search was initiated in response to a request dependent on certain encrypted plaintext appearing in a database, a positive output may be a trigger to allow the request to continue, and a negative output may be a trigger to cease and block the request. Other such suitable computer-readable outputs will be apparent to a person skilled in the art.

Alternatively, for example, the positive and/or negative output may be realised as a result of the search presented to a user on a display.

In this way, the result of the search operation can be actioned appropriately, either by a user or to instruct a further computer process.

Steps a) to c) of the second aspect may be performed in a secure environment remote from the first database storing the ciphertext and the first random salt, and the method may further comprise: receiving the first random salt from the first database; and receiving the first key from the second database.

In this way, as was the case with the encryption, a third party gaining access to any one storage and processing location carrying out embodiments of the invention cannot derive the plaintext which underlies the ciphertext. At no one point in time does there exist together sufficient information to generate the plaintext.

If the ciphertext has been encrypted using a key stream generated from the first key by a block cipher, the method of searching may further comprise: producing a key stream from the first key using the block cipher; producing n first salt blocks from the first random salt; partitioning the ciphertext into n ciphertext blocks; and partitioning the search term into n search term blocks, wherein step b)

comprises performing an exclusive OR operation on the n first salt blocks and the key stream to produce n modifier blocks, and wherein step c) comprises performing an exclusive OR operation on the second random salt and the n search term blocks, and wherein step d) comprises performing an exclusive OR operation on the block products of step c) and the n search term blocks to produce n salted search term blocks, optionally wherein the bytewise comparison is performed block by block for each of the n salted search term blocks and n ciphertext blocks.

In this way, the method of search uses as its encryption of the search term the same method of encryption that was used to encrypt the plaintext originally. This matching of search term and plaintext encryption facilitates accurate searching of the ciphertext.

Generating the modifier may further comprise performing a first bytewise rotation to the product of the exclusive OR operation on the second random salt and the first key to produce the modifier; producing modified ciphertext further comprises performing a second bytewise rotation to the modifier before performing the exclusive OR operation on the ciphertext and the modifier; and the first and second bytewise rotations are opposite in direction and equal in magnitude.

In such embodiments of the invention, an additional, optional, step is carried out during generation of the modifier, and that step is then undone prior to combination of the modifier and the ciphertext. The bytewise rotation applied to the modifier may be applied before the modifier is sent from the search term generation module, such that the security of the modifier (which has been produced using the key or a key stream) is improved. The rotation can then be reversed in order to restore the correspondence of the modifier to the salted search term.

As will be discussed in greater detail, the direction and magnitude of the bytewise rotation may vary over time, such that it is less easy to derive information about the key stream from the contents of successive modifiers.

In a third aspect of the invention, there is provided a computer-implemented method for decrypting ciphertext encrypted by a method according to the first aspect, the method for decrypting ciphertext comprising: i) receiving the ciphertext, the first key, and the first random salt; ii) performing an exclusive OR operation on the ciphertext and the first key to produce salted plaintext; and iii) performing an exclusive OR operation on the salted plaintext and the first random salt to produce plaintext.

Not only, therefore, is ciphertext produced according to the first aspect efficiently searchable, but also efficiently decryptable, due to the properties imparted in the ciphertext during encryption.

The method may further comprise: partitioning the ciphertext into n ciphertext blocks; producing n salt blocks from the first random salt; producing a key stream from the first key; and producing n plaintext blocks, wherein producing n plaintext blocks comprises performing steps ii) and iii) of claim 1 for each of the n ciphertext blocks, n salt blocks, and the key stream.

Advantages related to decryption of the ciphertext using a key stream are equivalent to those discussed in respect of key streams for encryption.

Generally, it will be apparent that optional method steps described in relation to the first aspect of the invention (encryption) are equally applicable to this third aspect of the invention (decryption). For example, if encryption was performed using AES-CTR-SIV, then decryption will be performed using AES-CTR-SIV.

In a fourth aspect of the invention, there is provided a data processing apparatus comprising means for carrying out the steps of the method of any of the first to third aspects.

In a fifth aspect of the invention, there is provided a computer program comprising instructions which, when the program is executed by a computer, cause the computer to carry out the steps of the method of any one of the first to third aspects.

In a sixth aspect of the invention, there is provided a computer-readable storage medium having stored thereon the computer program of the fifth aspect.

BRIEF DESCRIPTION OF THE DRAWINGS

Embodiments of the invention will be described, by way of example, with reference to the following drawings, in which.

DETAILED DESCRIPTION

The invention is described below with reference to a number of different embodiments and the aforementioned figures. These embodiments are merely illustrative and are not intended to limit the scope of the appended claims.

Figure 1:
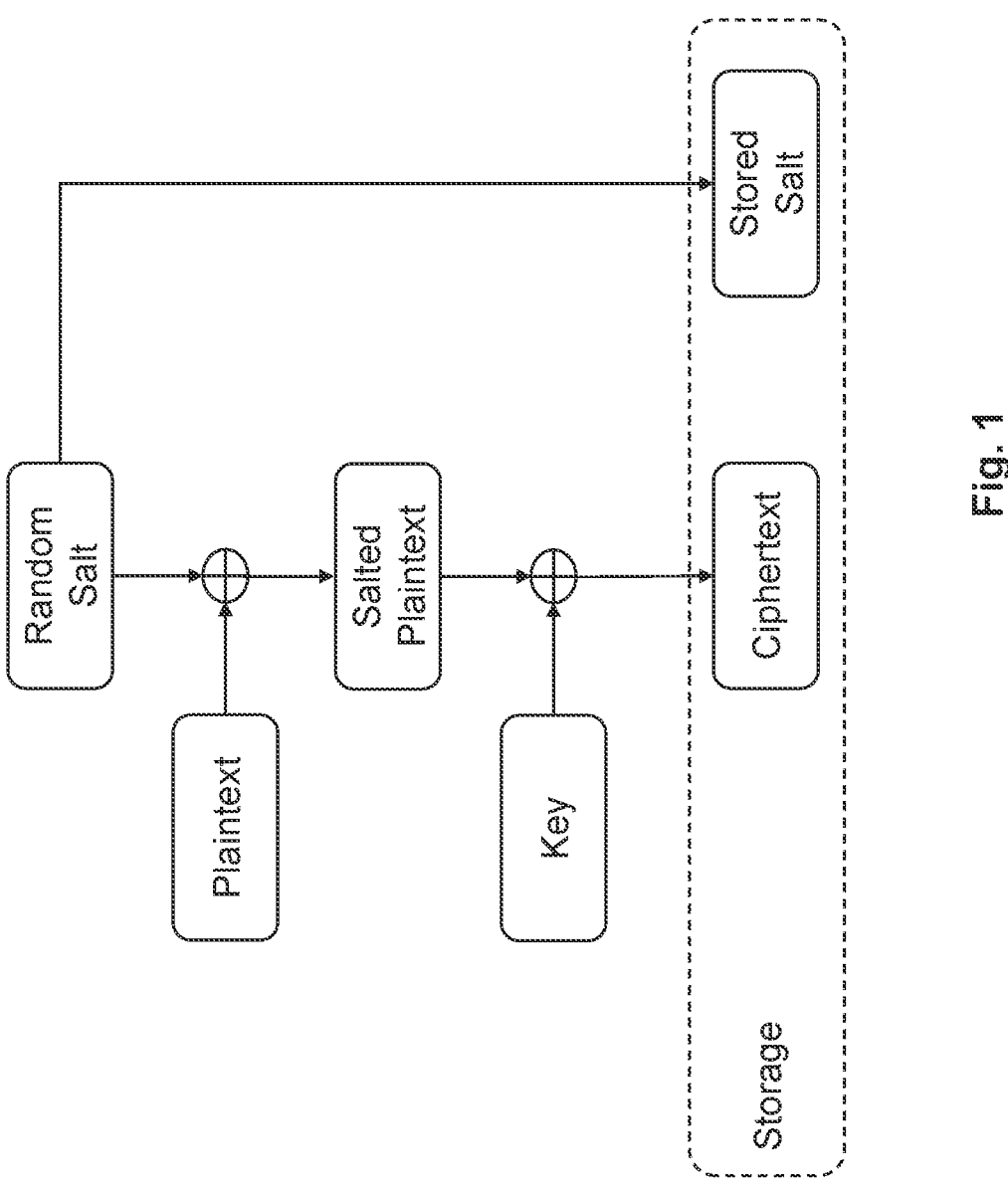
FIG. 1 illustrates a method of encryption according to an embodiment of the invention.

Referring to FIG. 1, a flow diagram depicting a method of encryption according to the present invention is shown.

Plaintext is received to be encrypted. In a first step, a random salt is generated with a length matching the plaintext, such that the two can be effectively combined via an exclusive OR operation. It is possible to perform a partial exclusive OR operation if the random salt and plaintext are different lengths; the overlap of the longer data item is simply unchanged by the operation. While possible in embodiments of the invention, the overlapping bits of data are, in effect, portions of either the plaintext or random salt appearing in the clear. Such embodiments are therefore less secure than if the random salt and plaintext are of matching length.

The random salt and plaintext are combined using an exclusive OR operation to form salted plaintext. An encryption key is then received for use in the encryption. The encryption key may be received from an external source to the processing unit performing the exclusive OR operations, or from a key generation source at the same processing unit. In a similar manner to the length of the salt, the key is preferably generated with a length matching that of the salted plaintext for data security purposes.

The salted plaintext is then combined with the encryption key using a second exclusive OR operation. In this context, an exclusive OR operation with an encryption key is referred to as an encryption. The result of the second exclusive OR operation is ciphertext. The ciphertext is stored in a storage location, such as a database, alongside the random salt used in its generation.

The random salt that has been used to encrypt the ciphertext may be referred to as a stored salt, or synonymously as a first random salt, once it has been stored following salting of the plaintext prior to its encryption with the encryption key. The first random salt/stored salt is thereby distinguished from the second random salt which is generated as part of methods of searching ciphertext.

The key remains associated with the ciphertext, for example via metadata associated with one allowing identification of the other, but is preferably not stored in the same storage location as the ciphertext and first random salt.

Figure 2:
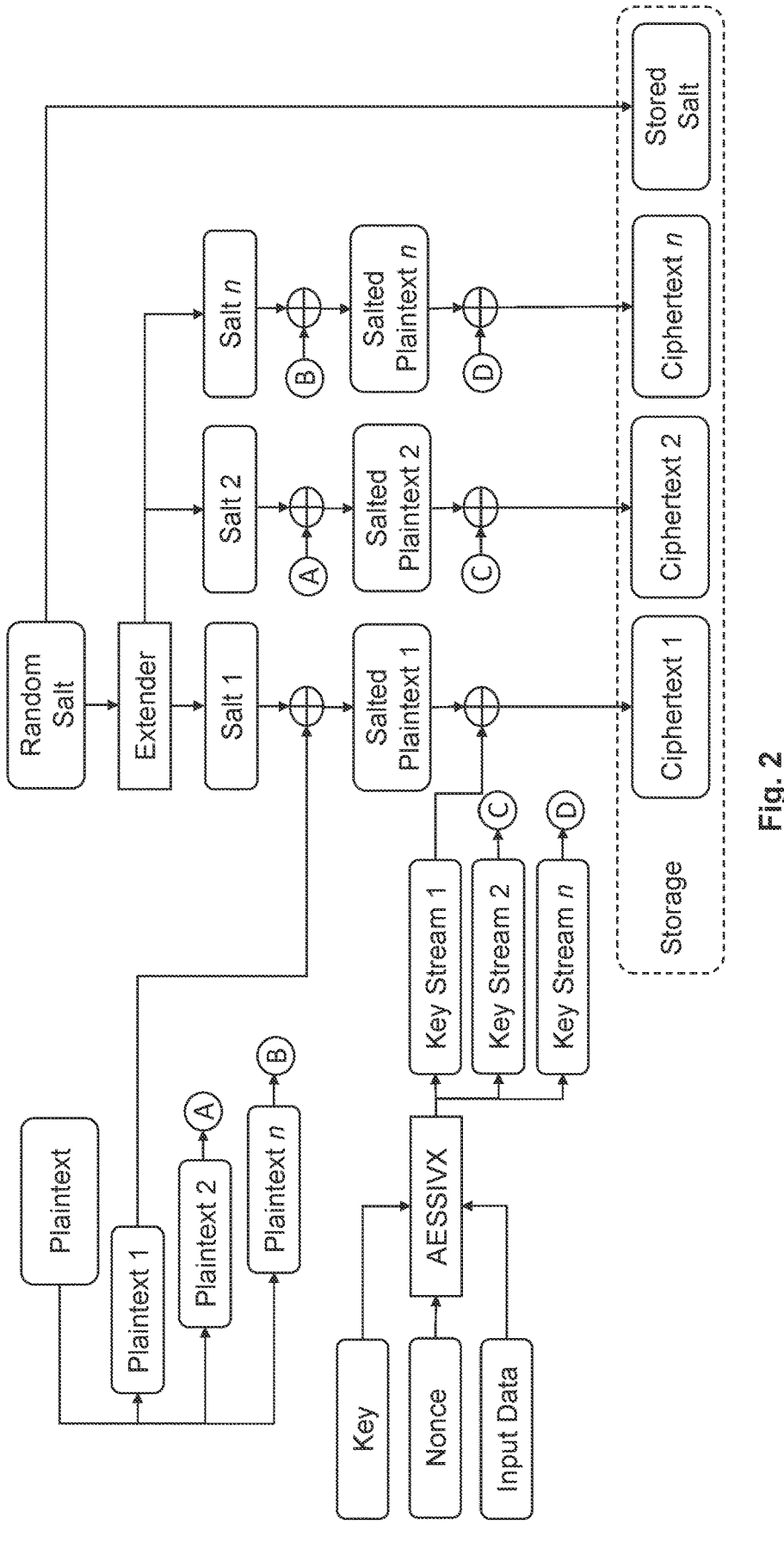
FIG. 2 illustrates a method of encryption using key streaming according to an embodiment of the invention.
Figure 3:
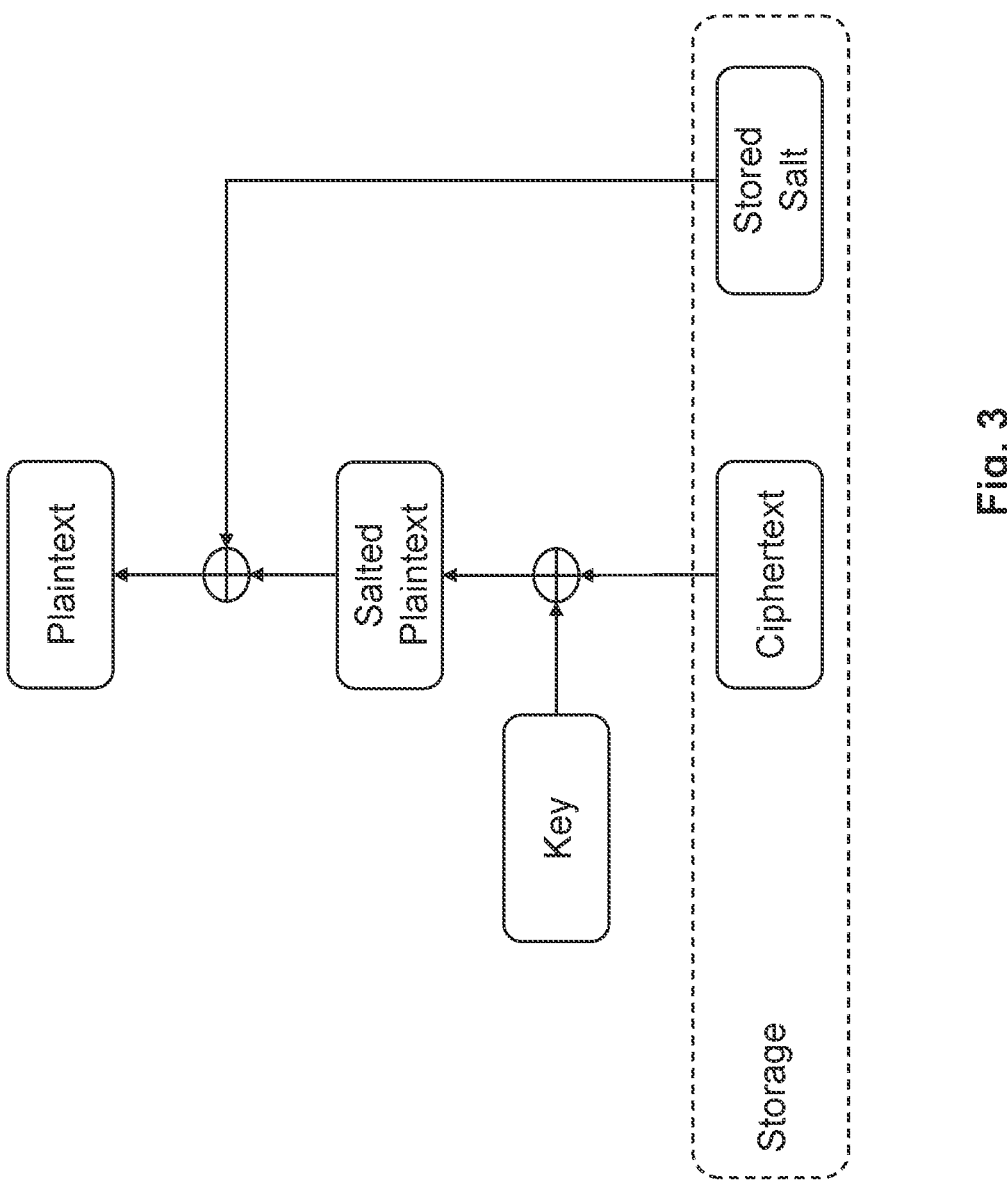
FIG. 3 illustrates a method of decryption according to an embodiment of the invention.
Figure 4:
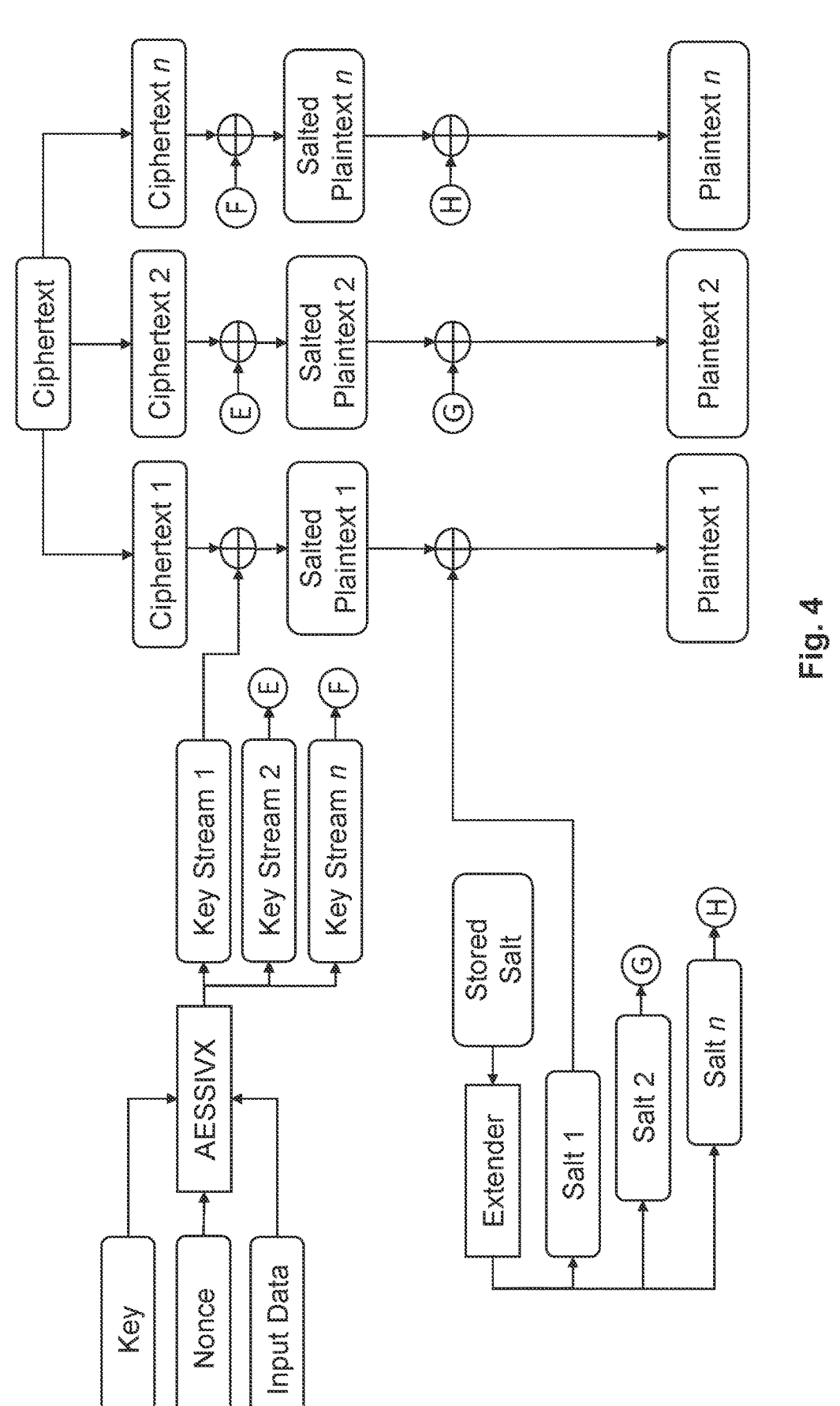
FIG. 4 illustrates a method of decryption using key streaming according to an embodiment of the invention.

In some embodiments, the processes of salting with a first random salt and encrypting with an encryption key can be performed in the alternative order to that shown in FIG. 1, and indeed as shown in FIGS. 2 to 4 described in greater detail below. The nature of the exclusive OR functions used to combine sequentially the plaintext with a first random salt and an encryption key is such that the same result can be achieved whether the plaintext is first salted and then encrypted, or first encrypted and then salted. The same is true of ciphertext in the case of a decryption; the ciphertext can be first 'de-salted' and then decrypted, rather than the reverse as shown.

It is also anticipated that the first random salt and encryption key could first be combined using an exclusive OR operation, before the result is combined with the plaintext via an exclusive OR function. What is crucial to produce ciphertext having the necessary properties for effective and secure search is that the entire length of the plaintext has experienced an exclusive OR operation with a first random salt and an exclusive OR operation with an encryption key.

Referring to FIG. 2, a flow diagram of a method of encryption similar in substance to that of FIG. 1 is depicted, but according to FIG. 2 the method is implemented using a block cipher in a stream mode of operation. The block cipher in a stream mode of operation depicted is AES with a synthetic IV. The use of a synthetic IV retains security even in the case of nonce re-use, so the nonce content needs less strict control than with other methods.

One of a number of counter or feedback modes may be used, including GCM and CTR, and OFB and CFB, respectively.

A first random salt and key are received. The first random salt is extended to the length of the plaintext to be encrypted, for example by repeated hashing where the salt block length is the hash digest length. The length of salt block as determined by the hash digest length may then be applied to the plaintext and key stream in order to generate respective blocks of plaintext and key stream with the same length as the blocks of salt.

Blocks herein are referred to as 1, 2, and n. It will be appreciated that there may be as few as two blocks, and any number of blocks greater than two up to n.

The plaintext is also partitioned into a number of blocks, as above, with length matching the length of each block of salt. An encryption key is received for input to AESSIVX, along with a nonce and input data. As described above, a nonce is any number used only once and is standard when using AES. The input data, however, differs from being the plaintext as would be common when using AES, and is instead not the plaintext but data which is associated with the plaintext.

As described in relation to FIG. 1, the encryption key may be received from an external source to the processing unit performing the exclusive OR operations, or from a key generation source at the same processing unit. The nonce and input data may be generated as part of the method of encryption, or may also be received along with the key.

Alternatively, the production of a key stream may be outsourced to a remote processing unit, and the processing unit performing the encryption may simply receive the key stream or pre-partitioned blocks of the key stream.

Following broadly the same steps as described in relation to FIG. 1, but block-by-block, the plaintext is salted by being combined with the first random salt using a number of exclusive OR operations, the number of exclusive OR operations being equal to the number of blocks. The blocks of salted plaintext are then encrypted by being combined with the blocks of the key stream using a number of exclusive OR operations.

The result of the encryption level exclusive OR operations is a series of blocks of ciphertext, matching in length and number the blocks of salted plaintext and key stream. These blocks are then stored in a storage location, such as a database, alongside their associated random salt.

The blocks of ciphertext can at this stage be concatenated with one another, i.e. their "block" nature removed after encryption, or can remain stored as blocks of ciphertext.

The key remains associated with the ciphertext, for example via metadata associated with one allowing identification of the other, but is preferably not stored in the same storage location as the ciphertext and first random salt.

In FIG. 2, and indeed throughout the Figures, circled capital letters, e.g. "A" as follows "Plaintext 2", are used simply as a replacement for connections with arrows for conciseness and clarity of the Figures. In other words, these are not algorithmic processes nor data items.

Referring to FIG. 3, a method of decryption according to an embodiment of the invention is depicted.

In a first step, ciphertext for decryption and an associated first random salt may be retrieved from a storage location. The encryption key under which the ciphertext is encrypted may then be requested from its storage location, which is preferably different to that in which the ciphertext and first random salt are stored. The ciphertext is preferably ciphertext generated in accordance with a method according to embodiments of the invention, for example as shown in FIG. 1. The method of decryption as shown in FIG. 3 is suitable for any ciphertext which is both salted and encrypted, and for which the salt and key used to perform these operations are available.

In what is a reversal of the steps shown in FIG. 1, an exclusive OR operation is performed on the ciphertext and the encryption key to produce salted plaintext, and an exclusive OR operation is performed on the salted plaintext and the first random salt in order to generate the plaintext.

Referring to FIG. 4, a method of decryption using key streaming according to an embodiment of the invention is depicted.

FIG. 4 is a key streaming embodiment of the method shown in FIG. 3 in much the same way that FIG. 2 is a key streaming embodiment of the method shown in FIG. 1.

As with the method shown in FIG. 3, the ciphertext and associated first random salt are retrieved from their storage location(s). Either an encryption key can be received, and an AESSIVX algorithm used to produce a suitable key stream, or a key stream can be received. The nonce and input data will also match the nonce and input data used when first encrypting the ciphertext, such that an identical key stream is produced by AESSIVX.

The first random salt is extended in order to produce blocks of salt. The algorithm used to extend the first random salt for the purpose of decryption should match the algorithm used to extend the first random salt for the purpose of encryption, such that the blocks of salt produced in each case are identical.

Alternatively, when storing the first random salt at the point of encryption, each block of salt as extended could be stored, rather than the first random salt. While less efficient in terms of storage capacity, this may be advantageous for processing efficiency by obviating the need to re-extend the salt at the point of decryption, or indeed search. In other words, at the point of decryption or search, the already extended blocks could be retrieved rather than the first random salt in need of extending.

In a first step, for each block of ciphertext and for each respective block of key stream are subjected to an exclusive OR operation in order to produce blocks of salted plaintext. The blocks of salted plaintext are then subjected to an exclusive OR operation with a respective block of salt in order to produce blocks of plaintext. The blocks of plaintext may then be concatenated with one another to produce the complete plaintext in clear to complete the decryption.

Figure 5:
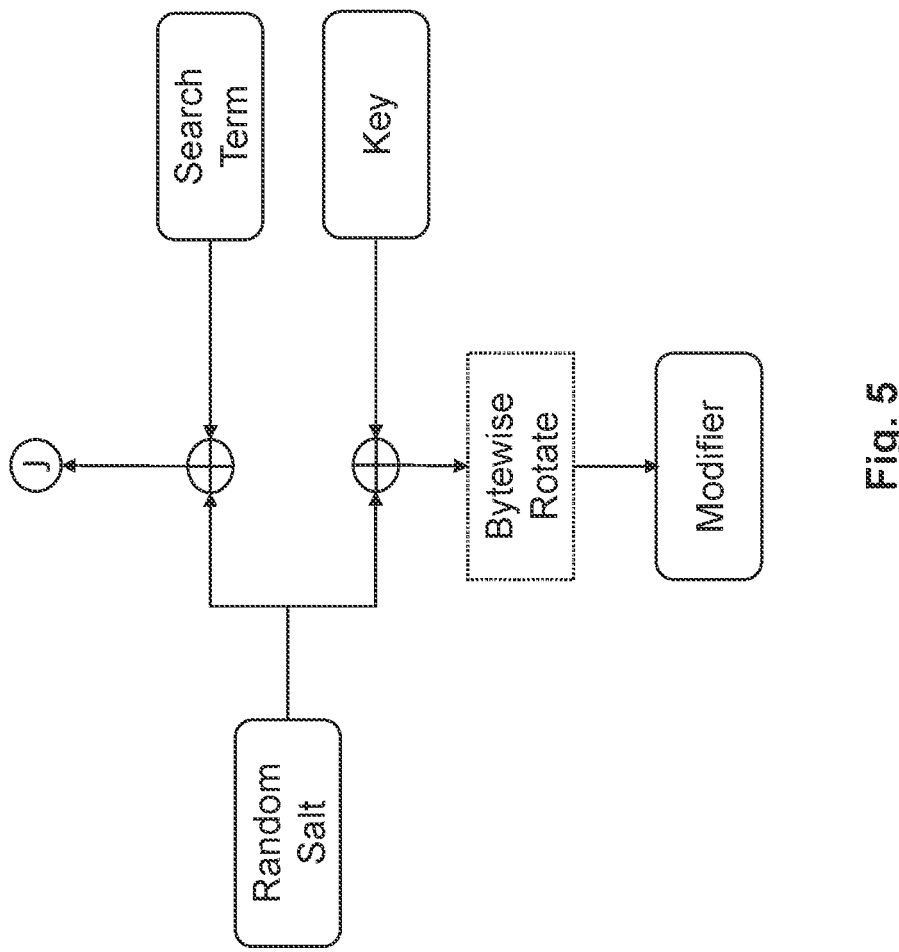
FIG. 5 illustrates a first part of a method of searching ciphertext in accordance with an embodiment of the invention; the generation of a modifier and second random salt-search term product.

FIG. 5 illustrates a first part of a method of searching ciphertext in accordance with an embodiment of the invention; the generation of a modifier and second random salt-search term product.

In a first step, a second random salt is generated. As detailed above, this is a different random salt to the random salt generated for use in decryption, stored alongside or associated with the ciphertext, and retrieved for the purpose of decryption. In some embodiments, the second random salt is prevented from being identical to the first random salt in order to avoid any possibility of accidental de-salting of the ciphertext by combining the first and second random salts.

The second random salt may be generated with a length equal to that of the search term and encryption key in order to facilitate the performance of the exclusive OR operations.

A search term is received, as is the encryption key that was used to encrypt the ciphertext being interrogated.

An exclusive OR operation is performed on the second random salt and the search term in order to produce J in FIG. 5, which is a second random salt-search term product. A separate exclusive OR operation is performed on the second random salt and the encryption key in order to produce a modifier. These two exclusive OR operations can be performed in any order, or simultaneously.

In some embodiments, a bytewise rotation is applied to the product of the exclusive OR operation performed on the second random salt and the encryption key before that product (the salted key stream) is considered a completed modifier. A bytewise, or bitwise, rotation, as will be appreciated by a skilled person, involves a byte shift of a certain magnitude and direction, with bits 'falling off the end' being reintroduced at the other end of the data item. For example, a one bit left-wise rotation of 1010001 would produce 0100011, and a two bit right-wise rotation would produce 0110100. Bytewise rotations as employed by the present invention may be a pre-determined direction and pre-determined number of bits, for example between zero and eight bits.

Figure 6:
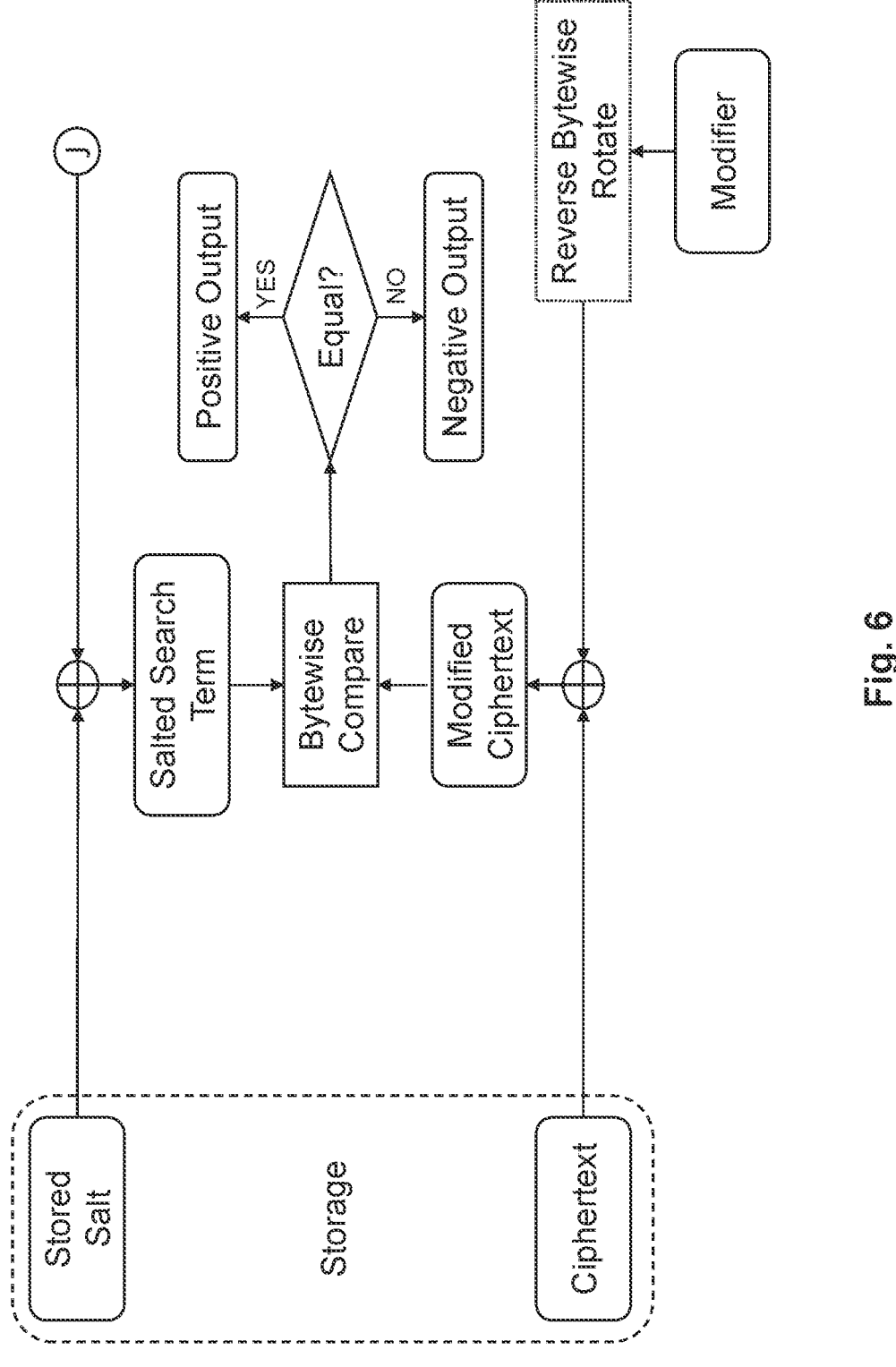
FIG. 6 illustrates a second part of a method of searching ciphertext in accordance with an embodiment of the invention, using a previously generated modified and second random salt-search term product.

FIG. 6 illustrates a second part of a method of searching ciphertext in accordance with an embodiment of the invention, using a previously generated modified and second random salt-search term product.

The second random salt-search term product, or product J as shown in FIGS. 5 and 6, is combined via an exclusive OR operation with the stored salt associated with a given ciphertext of interest. The product is referred to as a salted search term.

The ciphertext of interest and the modifier are also subjected to an exclusive OR operation, and the product is referred to as modified ciphertext. In embodiments in which the modifier was subjected to a bytewise rotation, the bytewise rotation is reversed prior to the exclusive OR operation with the ciphertext. A reverse bytewise rotation in this context involves a bytewise rotation of the same magnitude as has previously been applied to the salted key stream, but in the opposite direction. For example, a two bit left-wise rotation is reversed by a two bit right-wise rotation, to produce a data item matching the originally salted key stream.

The products of the two exclusive OR operations described above are the salted search term and the modified ciphertext. A bytewise comparison of these two data items is now performed, and if the modified ciphertext matches the salted search term, it can be determined that the search term is identical to the plaintext that underpins the ciphertext of interest. This is because the algorithmic histories of the modified ciphertext and the salted search term lead to identical 'levels' of salting and encryption.

The modified ciphertext is based on the ciphertext, which was salted using the first random salt and encrypted using the encryption key during its original encryption phase. The modified ciphertext has also, in effect, been salted with the second random salt, because it has been combined with the modifier which, as shown in FIG. 5, includes the second random salt. The other effect of the exclusive OR operation between the ciphertext and the modifier is to remove the encryption key. Both the ciphertext and the modifier have been subjected to exclusive OR operations which included the encryption key. As a result, and due to the properties of exclusive OR operations, the effect of the encryption key is effectively removed from the modified ciphertext. The plaintext remains secure due to the salting, but the encryption key no longer encrypts the modified ciphertext.

Therefore, the modified ciphertext is, in effect, the plaintext salted by both the first and second random salts.

The salted search term has a simpler algorithmic history, in that it is the search term first salted with the second random salt (FIG. 5), and then by the first random salt (FIG. 6). The result is that the salted search term is, in effect, the plaintext salted by both the first and second random salts.

Therefore, it can be seen that if the search term matches the plaintext, and both have been 'doubly-salted' by exactly the same two salts, a bytewise comparison demonstrating that the salted search term and modified ciphertext are equal shows that the search term is identical to the plaintext. This is, fundamentally, the result that was being sought, but it has been determined without either search term or plaintext appearing in the clear, or even being derivable from the data that could possibly be obtained by a nefarious third party. This is at least in part because the salting of the search term is inherently non-deterministic, because it is based on a randomly generated salt. For this reason, the bytewise comparison, i.e. the performance of the search, need not be performed in a secure environment, because a third party cannot, even with access to the salted search term and modifier, derive the contents of the search term.

For the same reasons, a bytewise comparison demonstrating that the salted search term and the modified ciphertext are not equal demonstrates that the search term does not match the plaintext underpinning the ciphertext.

A positive output is generated if the bytewise comparison shows that the salted search term equals the modified ciphertext, and a negative output is generated if the bytewise comparison demonstrates that the salted search term does not equal the modified ciphertext.

It will be appreciated that searching a database populated with a plurality of ciphertexts and associated stored salts can be achieved by repeating the processes shown in FIGS. 5 and 6 for each ciphertext, associated stored salt, and associated key. In this way, it is possible efficiently and securely to determine whether or not a search term is present in a database of non-deterministically encrypted data.

Figure 7:
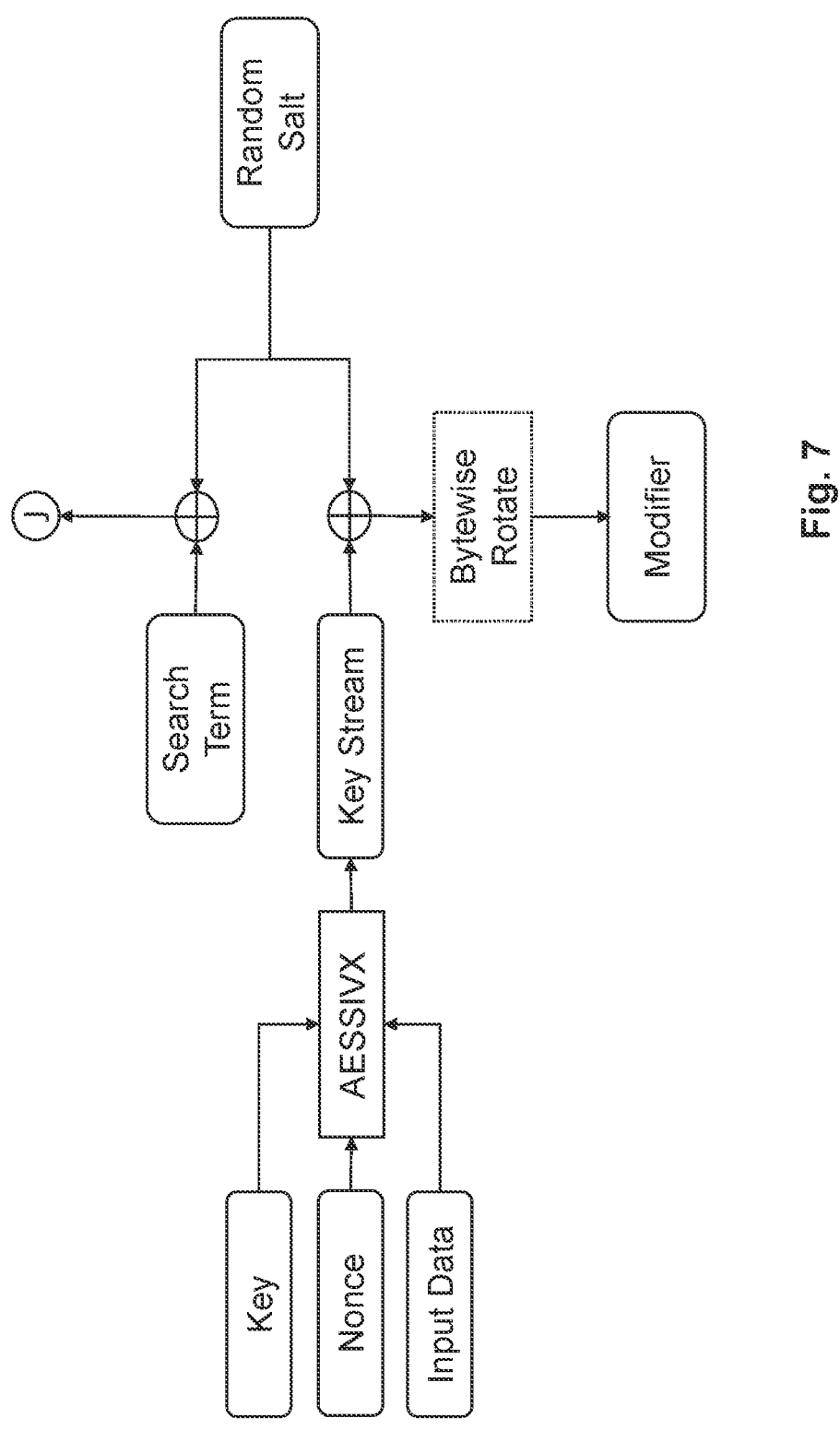
FIG. 7 illustrates a first part of a method of searching ciphertext in accordance with an embodiment of the invention; the generation of a modifier and second random salt-search term product, using key streaming.

FIG. 7 illustrates a first part of a method of searching ciphertext in accordance with an embodiment of the invention; the generation of a modifier and second random salt-search term product, using key streaming.

The method shown in FIG. 7 is the same process as the method shown in FIG. 5, in that a search term, second random salt, and key element are inputs and, via two exclusive OR operations, outputs of a modifier and second random salt-search term product (J) are produced. However, where in FIG. 5 the key element is the encryption key, in FIG. 7 AESSIVX is used to produce a key stream. The key stream may be produced as described elsewhere herein, using the encryption key, a nonce, and input data.

In some embodiments (not shown), an offset mechanism can be added to the generation of the modifier and second random salt-search term product, in order to support partial searching of the ciphertext. Such searches may comprise searching for a specific prefix or suffix, or searching for a term shorter than the ciphertext that appears in the centre of the ciphertext. In such embodiments, an offset is introduced to both the keystream and the search term prior to their respective exclusive OR operations with the second random salt. The resultant second random salt-search term product and modifier then contain the offset.

Again, in this embodiment, a bytewise rotation can be performed in the production of the modifier in order to increase security.

Figure 8:
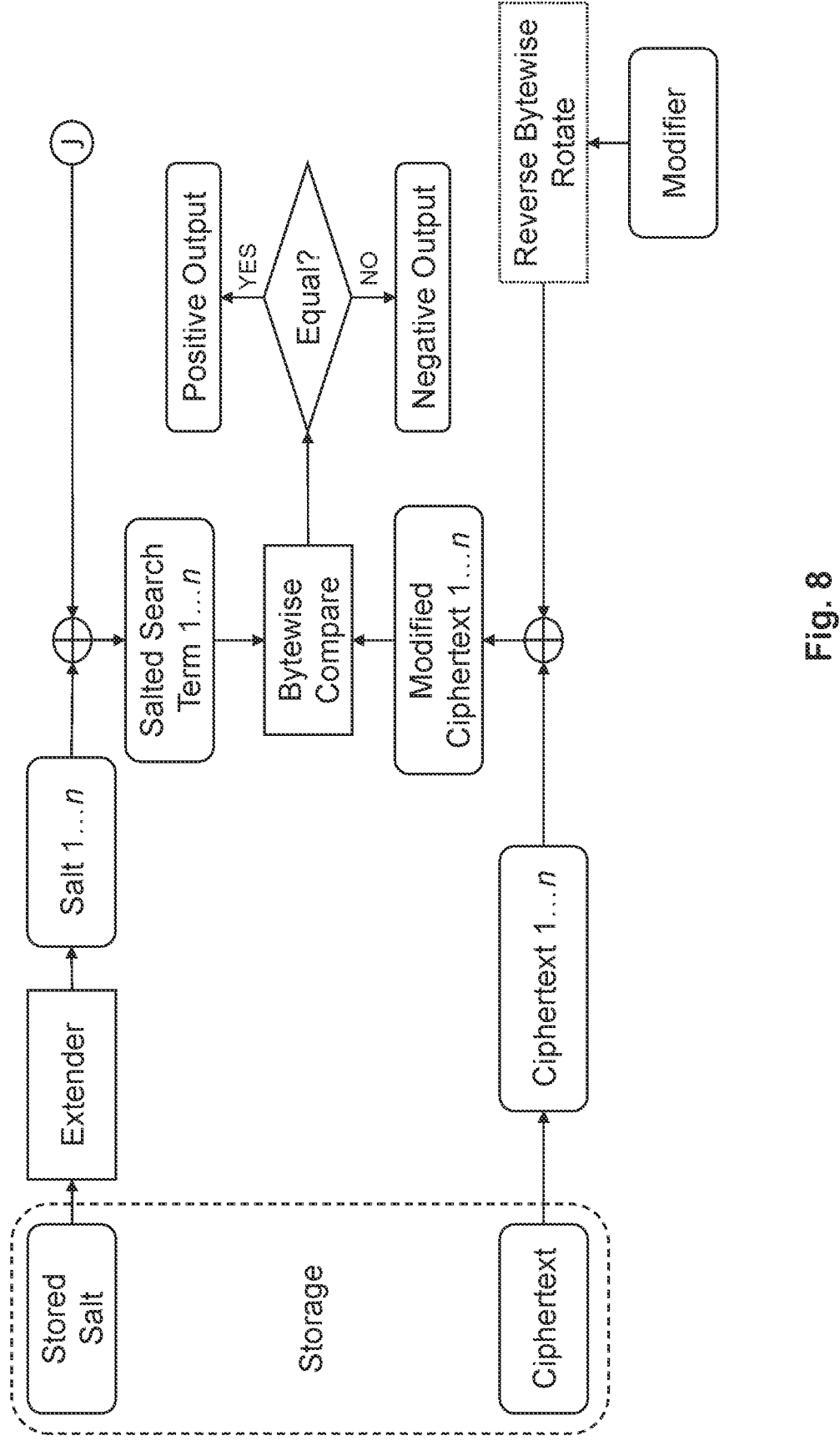
FIG. 8 illustrates a second part of a method of searching ciphertext in accordance with an embodiment of the invention, using a previously generated modified and second random salt-search term product, produced using key streaming.

FIG. 8 illustrates a second part of a method of searching ciphertext in accordance with an embodiment of the invention, using a previously generated modified and second random salt-search term product, produced using key streaming.

Similar to the progression from FIG. 5 to FIG. 7, FIG. 8 represents the use of the modifier and second random salt-search term product to perform a bytewise comparison, but accounting for the key streaming used in the method of FIG. 7.

If a bytewise rotation has been used in the production of the modifier, this is reversed prior to its exclusive OR operation with blocks 1 . . . n of the ciphertext. The ciphertext may be partitioned into blocks in any manner that will be apparent to the skilled person, including as described with reference to FIG. 4.

The stored salt (first random salt) is extended to become first random salt blocks 1 . . . n. The first random salt blocks may be the same length and number as the ciphertext blocks.

The modifier, in the context of FIG. 8, may be considered to be/referred to as a modified key steam. Since the modifier is produced using an exclusive OR operation on the key stream produced in FIG. 7, the modifier remains a stream in nature. In order to facilitate the exclusive OR operation between the modifier and the blocks of ciphertext, the modifier may be partitioned (not shown) into blocks of length and number matching the length and number of the blocks of ciphertext.

The second random salt-search term product may also be partitioned (not shown) into blocks of length and number equal to the blocks of the first random salt. The respective blocks can then be combined using an exclusive OR operation in order to produce blocks 1 . . . n of salted search term.

In embodiments in which the entire ciphertext is being searched, the search term will be equal in length to the plaintext, and thus equal in length to the ciphertext. Therefore, the ciphertext and search term having been partitioned into blocks 1 . . . n, the blocks 1 . . . n. of salted search term and blocks 1 . . . n of modified ciphertext will be equal in number and in length. The bytewise comparison can be performed block-by-block, or with multiple blocks compared in parallel. For a full ciphertext search, when key streaming is used, only if every block of salted search is identical to every respective block of modified ciphertext is a positive output generated. Therefore, a determination by the bytewise comparison that any block, or any byte within any block, of salted search term does not match its respective byte/block of modified ciphertext leads to a negative output.

In embodiments where an offset mechanism is used to perform a partial search, an offset is also applied to the ciphertext prior to its partition into blocks and exclusive OR operation with the blocks of the modifier.

Partial search using an offset is not limited to being performed in embodiments using key streaming. An offset as applied to the search term and encryption key when producing the modifier and second random salt-search term product, and then applied to the ciphertext during search, will allow partial searching in the same way as described with respect to embodiments using key streaming.

Figure 9:
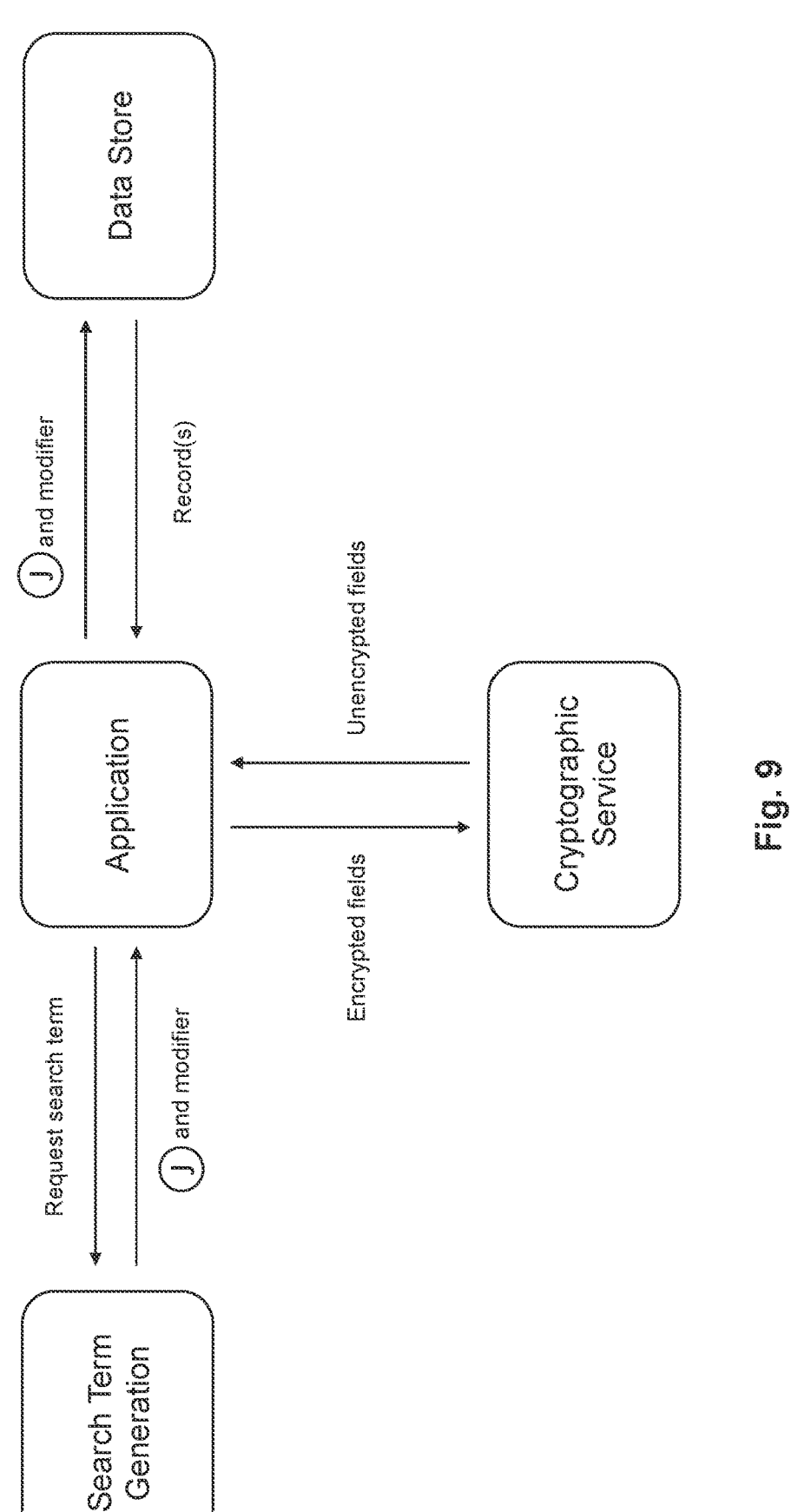
FIG. 9 illustrates a flow diagram showing modules of a computing system performing methods in accordance with embodiments of the invention.

FIG. 9 is a flow diagram showing modules of a computing system performing methods in accordance with embodiments of the invention.

The distributed computing system of FIG. 9 comprises a search term generation module, an application, a data store, and a cryptographic service. Each component of the computing system may be stored and implemented on a separate processing unit. Alternatively, multiple components may be stored on the same processing unit but implemented as distinct processing and storage modules, so as to maintain information separation between the modules.

The application first sends a request for a search term to the search term generation module. The request includes the search term and the encryption key or key stream, and may include the second random salt, as generated by the application. Alternatively, the second random salt can be generated by the search term generation module; this is preferable for the purposes of data security because the second random salt need not be transmitted between modules.

In response to the request, the search term generation module generates the modifier and second random salt-search term product (J), in accordance with methods such as those shown in FIGS. 5 and 7. The application then provides both the modifier and second random salt-search term product (J) to the data store.

The data store has saved within it one or more ciphertexts of interest, and each ciphertext has an associated first random salt also stored in the data store. For each of the one or more ciphertexts of interest, the data store produces a salted search term and modified ciphertext, in accordance with methods such as those shown in FIGS. 6 and 8. The data store also performs the bytewise comparison between the salted search term and modified ciphertext in order to generate either a positive or negative output.

The data store can either then return to the application simply the output of the bytewise comparison to the application, be that positive or negative, or can return a positive output along with the ciphertext for which the positive output was generated.

In this way, the first random salt (stored salt) never leaves the data store, so is not susceptible to being intercepted by a third party man-in-the-middle style attack.

Furthermore, all key management and search term creation functions are performed separately from the storage and searching of the data.

There may be additional identification and authorisation steps (not shown) performed by or in connection with the cryptographic service, which prohibit access to encryption key material and operations using encryption keys until requestor identity and authorisation is obtained.

Various numbered embodiments of the present disclosure are set out below. These provide a disclosure of various computer-implemented methods for encrypting data, searching ciphertext, and decrypting ciphertext, and data processing apparatuses, computer programs, and computer readable storage media for achieving the same.

Numbered Embodiments

1. A computer-implemented method for encrypting data, comprising:
  i) receiving plaintext and a first key;
  ii) generating a first random salt;
  iii) performing an exclusive OR operation on the plaintext and the first random salt to produce salted plaintext; and
  iv) performing an exclusive OR operation on the salted plaintext and the first key to produce ciphertext.

2. The computer-implemented method of embodiment 1, further comprising:
  partitioning the plaintext into n plaintext blocks;
  producing n salt blocks from the first random salt; and
  producing a key stream from the first key; and
  producing n ciphertext blocks, wherein producing n ciphertext blocks comprises performing steps iii) and iv) of embodiment 1 for each of the n plaintext blocks, n salt blocks, and the key stream.

3. The computer-implemented method of embodiment 2, wherein producing a key stream from the first key comprises using a block cipher.

4. The computer-implemented method of embodiment 3, wherein the block cipher comprises an advanced encryption standard algorithm using the first key, a nonce, and first input data as inputs, wherein the first input data is not the plaintext.

5. The computer-implemented method of embodiment 4, wherein the first input data comprises data associated with the plaintext, for example a field name associated with the plaintext.

6. The computer-implemented method of embodiment 4 or embodiment 5, wherein the block cipher comprises a synthetic initialisation vector.

7. The computer-implemented method of embodiment 6, wherein the block cipher is configured to operate as a stream cipher, optionally wherein the block cipher is one of: Galois Counter Mode (AES-GCM-SIV), Counter Mode (AES-CTR-SIV), Cipher Feedback Mode (AES-CFB-SIV), and Output Feedback Mode (AES-OFB-SIV).

8. The computer-implemented method of any one of embodiments 2 to 7, wherein producing n salt blocks from the first random salt comprises passing the first random salt through an extender, and wherein the n salt blocks are produced so as to have a combined byte length equal to the byte length of the plaintext.

9. The computer-implemented method of any preceding embodiment, further comprising:
  storing the ciphertext and the first random salt in a first database; and
  storing the first key in a second database, the first and second database being remote from one another.

10. A computer-implemented method for searching ciphertext encrypted by a method according to any one of the preceding embodiments, the method comprising:
  i) receiving the ciphertext, the first key, the first random salt, and a search term;
  ii) generating a salted search term and a modifier, comprising:
    a) generating a second random salt;
    b) performing an exclusive OR operation on the second random salt and the first key to produce the modifier;
    c) performing an exclusive OR operation on the second random salt and the search term; and
    d) performing an exclusive OR operation on the product of step c) and the first random salt to produce a salted search term;
  iii) performing an exclusive OR operation on the ciphertext and the modifier to produce modified ciphertext; and
  iv) performing a bytewise comparison between the modified ciphertext and the salted search term to determine a level of similarity between the salted search and the modified ciphertext.

11. The computer-implemented method of embodiment 10, further comprising:
  providing a positive output if the salted search and at least a portion of the modified ciphertext are identical, the positive output indicating that the search term exists in the plaintext; and
  providing a negative output if the salted search is not identical with any portion of the modified ciphertext, the negative output indicating that the search term does not exist in the plaintext.

12. The computer-implemented method of embodiment 10 or embodiment 11, wherein steps a) to c) are performed in a secure environment remote from the first database storing the ciphertext and the first random salt, and further comprises:
  receiving the first random salt from the first database; and
  receiving the first key from the second database.

13. The computer-implemented method of any one of embodiments 10 to 12, wherein the ciphertext has been encrypted using a key stream generated from the first key by a block cipher, further comprising:

producing a key stream from the first key using the block cipher;

producing n first salt blocks from the first random salt;

partitioning the ciphertext into n ciphertext blocks; and partitioning the search term into n search term blocks, wherein step b) comprises performing an exclusive OR operation on the n first salt blocks and the key stream to produce n modifier blocks, and wherein step c) comprises performing an exclusive OR operation on the second random salt and the n search term blocks, and wherein step d) comprises performing an exclusive OR operation on the block products of step c) and the n search term blocks to produce n salted search term blocks.

14. The computer-implemented method of embodiment 13, wherein the bytewise comparison is performed block by block for each of the n salted search term blocks and n ciphertext blocks.

15. The computer-implemented method of any one of embodiments 10 to 14, wherein:

generating the modifier further comprises performing a first bytewise rotation to the product of the exclusive OR operation on the second random salt and the first key to produce the modifier;

producing modified ciphertext further comprises performing a second bytewise rotation to the modifier before performing the exclusive OR operation on the ciphertext and the modifier; and the first and second bytewise rotations are opposite in direction and equal in magnitude.

16. The computer-implemented method of any one of embodiments 13 to 15, wherein producing a key stream from the first key comprises using a block cipher.

17. The computer-implemented method of embodiment 16, wherein the block cipher comprises an advanced encryption standard algorithm using the first key, a nonce, and first input data as inputs, wherein the first input data is not the plaintext.

18. The computer-implemented method of embodiment 17, wherein the first input data comprises data associated with the plaintext, optionally wherein the first input data comprises a field name associated with the plaintext.

19. The computer-implemented method of embodiment 17 or embodiment 18, wherein the block cipher comprises a synthetic initialisation vector.

20. The computer-implemented method of embodiment 19, wherein the block cipher is configured to operate as a stream cipher, optionally wherein the block cipher is one of: Galois Counter Mode (AES-GCM-SIV), Counter Mode (AES-CTR-SIV), Cipher Feedback Mode (AES-CFB-SIV), and Output Feedback Mode (AES-OFB-SIV).

21. The computer-implemented method of any one of embodiments 13 to 20, wherein producing n first salt blocks from the first random salt comprises passing the first random salt through an extender, and wherein the n first salt blocks are produced so as to have a combined byte length equal to the byte length of the plaintext.

22. A computer-implemented method for decrypting ciphertext encrypted by a method according to any one of embodiments 1 to 9, the method for decrypting ciphertext comprising:

i) receiving the ciphertext, the first key, and the first random salt;

ii) performing an exclusive OR operation on the ciphertext and the first key to produce salted plaintext; and

18 iii) performing an exclusive OR operation on the salted plaintext and the first random salt to produce plaintext.

23. The computer-implemented method of embodiment 16, further comprising:

partitioning the ciphertext into n ciphertext blocks;

producing n salt blocks from the first random salt; and producing a key stream from the first key; and producing n plaintext blocks, wherein producing n plaintext blocks comprises performing steps ii) and iii) of embodiment 1 for each of the n ciphertext blocks, n salt blocks, and the key stream.

24. The computer-implemented method of embodiment 23, wherein producing a key stream from the first key comprises using a block cipher.

25. The computer-implemented method of embodiment 24, wherein the block cipher comprises an advanced encryption standard algorithm using the first key, a nonce, and first input data as inputs, wherein the first input data is not the plaintext.

26. The computer-implemented method of embodiment 25, wherein the first input data comprises data associated with the plaintext, optionally wherein the first input data comprises a field name associated with the plaintext.

27. The computer-implemented method of embodiment 25 or embodiment 26, wherein the block cipher comprises a synthetic initialisation vector.

28. The computer-implemented method of embodiment 27, wherein the block cipher is configured to operate as a stream cipher, optionally wherein the block cipher is one of: Galois Counter Mode (AES-GCM-SIV), Counter Mode (AES-CTR-SIV), Cipher Feedback Mode (AES-CFB-SIV), and Output Feedback Mode (AES-OFB-SIV).

29. The computer-implemented method of any one of embodiments 23 to 28, wherein producing n salt blocks from the first random salt comprises passing the first random salt through an extender, and wherein the n salt blocks are produced so as to have a combined byte length equal to the byte length of the plaintext.

30. The computer-implemented method of embodiment 10 or embodiment 11, wherein receiving the ciphertext, the first key, and the first random salt comprises:

receiving the ciphertext and the first random salt from the first database; and receiving the first key from the second database, the first and second databases being remote from one another.

31. A data processing apparatus comprising means for carrying out the steps of the method of any one of embodiments 1 to 30.

32. A computer program comprising instructions which, when the program is executed by a computer, cause the computer to carry out the steps of the method of any one of embodiments 1 to 31.

33. A computer-readable storage medium having stored thereon the computer program of embodiment 32.

The invention claimed is:

1. A computer-implemented method for searching ciphertext, the ciphertext comprising plaintext encrypted under a first key by an exclusive OR operation and under a first random salt by an exclusive OR operation, the method for searching ciphertext comprising:

i) receiving the first key and a search term;

ii) generating a salted search term and a modifier, comprising:

a) generating a second random salt;

b) performing an exclusive OR operation on the second random salt and the first key to produce the modifier;

c) performing an exclusive OR operation on the second random salt and the search term; and d) performing an exclusive OR operation on the product of stepc) and the first random salt to produce the salted search term;

iii) performing an exclusive OR operation on the ciphertext and the modifier to produce modified ciphertext; and iv) performing a bytewise comparison between the modified ciphertext and the salted search term to determine a level of similarity between the salted search term and the modified ciphertext.

2. A computer-implemented method for encrypting data performed prior to the method for searching ciphertext according to claim 1, the method for encrypting data comprising:

i) receiving the plaintext and the first key;

ii) generating the first random salt;

iii) performing an exclusive OR operation on the plaintext and the first random salt to produce salted plaintext; and iv) performing an exclusive OR operation on the salted plaintext and the first key to produce ciphertext.

3. The computer-implemented method of claim 1, the method for encrypting data further comprising:

partitioning the plaintext into n plaintext blocks;

producing n salt blocks from the first random salt;

producing a key stream from the first key; and producing n ciphertext blocks, wherein producing n ciphertext blocks comprises performing steps iii) and iv) of claim 1 for each of the n plaintext blocks, n salt blocks, and the key stream.

4. The computer-implemented method of claim 3, wherein producing a key stream from the first key comprises using a block cipher, optionally wherein the block cipher comprises an advanced encryption standard algorithm using the first key, a nonce, and first input data as inputs, wherein the first input data is not the plaintext, further optionally wherein the first input data comprises data associated with the plaintext, optionally wherein the first input data comprises a field name associated with the plaintext.

5. The computer-implemented method of claim 4, wherein the block cipher comprises a synthetic initialisation vector, optionally wherein the block cipher is configured to operate as a stream cipher, optionally wherein the block cipher is one of: Galois Counter Mode (AES-GCM-SIV), Counter Mode (AES-CTR-SIV), Cipher Feedback Mode (AES-CFB-SIV), and Output Feedback Mode (AES-OFB-SIV).

6. The computer-implemented method of claim 3, wherein producing n salt blocks from the first random salt comprises passing the first random salt through an extender, and wherein the n salt blocks are produced so as to have a combined byte length equal to the byte length of the plaintext.

7. The computer-implemented method of claim 2, the method for encrypting data further comprising:

storing the ciphertext and the first random salt in a first database; and storing the first key in a second database, the first and second database being remote from one another.

8. The computer-implemented method of claim 1, further comprising:

providing a positive output if the salted search term and at least a portion of the modified ciphertext are identical, the positive output indicating that the search term exists in the plaintext; and providing a negative output if the salted search term is not identical with any portion of the modified ciphertext, the negative output indicating that the search term does not exist in the plaintext.

9. The computer-implemented method of claim 1, wherein steps a) to c) are performed in a secure environment remote from a first database storing the ciphertext and the first random salt, and wherein the method further comprises:

receiving the first random salt from the first database; and receiving the first key from a second database storing the first key.

10. The computer-implemented method of claim 1, wherein the ciphertext has been encrypted using a key stream generated from the first key by a block cipher, further comprising:

producing a key stream from the first key using the block cipher;

producing n first salt blocks from the first random salt;

partitioning the ciphertext into n ciphertext blocks; and partitioning the search term into n search term blocks, wherein step b) comprises performing an exclusive OR operation on the n first salt blocks and the key stream to produce n modifier blocks, and wherein step c) comprises performing an exclusive OR operation on the second random salt and the n search term blocks, and wherein step d) comprises performing an exclusive OR operation on the block products of step c) and the n search term blocks to produce n salted search term blocks, optionally wherein the bytewise comparison is performed block by block for each of the n salted search term blocks and n ciphertext blocks.

11. The computer-implemented method of claim 1, wherein:

generating the modifier further comprises performing a first bytewise rotation to the product of the exclusive OR operation on the second random salt and the first key to produce the modifier;

producing modified ciphertext further comprises performing a second bytewise rotation to the modifier before performing the exclusive OR operation on the ciphertext and the modifier; and the first and second bytewise rotations are opposite in direction and equal in magnitude.

12. A computer-implemented method for decrypting ciphertext encrypted by the method for encrypting data according to claim 2, the method for decrypting ciphertext comprising:

i) receiving the ciphertext, the first key, and the first random salt;

ii) performing an exclusive OR operation on the ciphertext and the first key to produce salted plaintext; and iii) performing an exclusive OR operation on the salted plaintext and the first random salt to produce plaintext.

13. The computer-implemented method of claim 12, further comprising:

partitioning the ciphertext into n ciphertext blocks;

producing n salt blocks from the first random salt;

producing a key stream from the first key; and producing n plaintext blocks, wherein producing n plaintext blocks comprises performing steps ii) and iii) of claim 1 for each of the n ciphertext blocks, n salt blocks, and the key stream.

14. A distributed computing system comprising a cryptographic processing unit for performing the steps of the method of claim 2.

15. At least one non-transitory computer readable storage medium storing a computer program of instructions configured to be readable by at least one computer processor for instructing the at least one computer processor to execute a computer process for performing the method as recited in claim 2.

16. A distributed computing system comprising at least a search term generation module and a data store for performing the steps of the method of claim 1.

17. A distributed computing system comprising a cryptographic processing unit for performing the steps of the method of claim 12.

18. At least one non-transitory computer readable storage medium storing a computer program of instructions configured to be readable by at least one computer processor for instructing the at least one computer processor to execute a computer process for performing the method as recited in claim 1.

19. At least one non-transitory computer readable storage medium storing a computer program of instructions configured to be readable by at least one computer processor for instructing the at least one computer processor to execute a computer process for performing the method as recited in claim 12.

* * * * *